(12) United States Patent  (10) Patent No.: US 7,271,978 B1
Santini et al.  (45) Date of Patent: Sep. 18, 2007

(54) DISK DRIVE INCLUDING A PRINTED CIRCUIT BOARD ASSEMBLY AND A PCBA SHIELD WITH TABS ENGAGED IN SLOTS OF A DISK DRIVE BASE

(75) Inventors: Victor W. Santini, Cupertino, CA (US); Aaron D. Little, Campbell, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 386 days.

(21) Appl. No.: 11/086,636

(22) Filed: Mar. 21, 2005

(51) Int. Cl.
 *G11B 5/012* (2006.01)
(52) U.S. Cl. .................................. 360/97.01
(58) Field of Classification Search ............ None
 See application file for complete search history.

(56) References Cited

U.S. PATENT DOCUMENTS 5,502,604 A * 3/1996 Furay ............... 360/97.01

* cited by examiner

*Primary Examiner*—A. J. Heinz
(74) *Attorney, Agent, or Firm*—Stetina, Brunda, Garred & Brucker

(57) ABSTRACT

A disk drive includes a disk drive base including a pair of tab engagement slots. The disk drive further includes a printed circuit board assembly and a PCBA shield including a shield body having opposing first and second ends. The shield body is disposed against the printed circuit board assembly with the printed circuit board assembly between the PCBA shield and the disk drive base. The PCBA shield includes a pair of tabs extending from and integrally formed with the shield body at the first end. The tabs each are respectively disposed in the tab engagement slots for attaching the PCBA shield to the disk drive base. The tabs each are cooperatively sized and configured with the respective tab engagement slots to apply a force between the first end of the shield body and the printed circuit board assembly. The second end is attached to the disk drive base.

12 Claims, 4 Drawing Sheets

DISK DRIVE INCLUDING A PRINTED CIRCUIT BOARD ASSEMBLY AND A PCBA SHIELD WITH TABS ENGAGED IN SLOTS OF A DISK DRIVE BASE

CROSS REFERENCE TO RELATED APPLICATIONS

Not applicable.

BACKGROUND OF THE INVENTION

1. Field of the Invention

The present invention relates generally to disk drives, and in particular to a disk drive including a printed circuit board assembly and a PCBA shield with tabs engaged in slots of a disk drive base.

2. Description of the Prior Art

The typical hard disk drive includes a head disk assembly (HDA) and a printed circuit board assembly (PCBA) attached to a disk drive base of the HDA. The head disk assembly includes at least one disk (such as a magnetic disk), a spindle motor for rotating the disk, and a head stack assembly (HSA). The printed circuit board assembly includes a servo control system in the form of a disk controller for generating servo control signals. The head stack assembly includes at least one transducer head, typically several, for reading and writing data from and to the disk. The head stack assembly is controllably positioned in response to the generated servo control signals from the disk controller. In so doing, the attached heads are moved relative to tracks disposed upon the disk.

The head stack assembly includes an actuator assembly, at least one head gimbal assembly, and a flex circuit assembly. A conventional "rotary" or "swing-type" actuator assembly typically includes a rotary actuator having an actuator body. The actuator body has a bore and a pivot bearing cartridge engaged within the bore to facilitate rotational movement of the actuator assembly between limited positions about an axis of rotation. A coil support extends from one side of the actuator body. An actuator coil is supported by the coil support and is configured to interact with one or more permanent magnetic elements, typically a pair, to form a voice coil motor. One or more actuator arms extend from an opposite side of the actuator body. Each head gimbal assembly includes a transducer head, typically a magneto-resistive ("MR") head, which is distally attached to each of the actuator arms. Each magnetic disk includes opposing disk surfaces. Data may be recorded along data annular regions on a single disk surface or both. As such, the head stack assembly may be pivoted such that each transducer head is disposed adjacent to the various data annular regions from adjacent to the outer diameter to the inner diameter of each disk.

The spindle motor includes a spindle motor magnet and a stator. The magnet may be attached to an underside of the spindle motor hub. The stator may be disposed at the disk drive base and may be integrated therewith.

The printed circuit board assembly is attached to an underside of the disk drive base. A base insulator may be disposed between the disk drive base and the printed circuit board assembly for electrically insulating the various electrical components of the printed circuit board assembly from the disk drive base.

In some applications a PCBA shield may be provided for protecting the printed circuit board assembly from both physical damage and electrical discharge events. The PCBA shield is disposed over the printed circuit board assembly with the printed circuit board assembly between the PCBA shield and the disk drive base. For example, the disk drive may be used as a removable device for use with a host electronic unit, such as in a card slot configuration. In this regard, in the absence of the PCBA shield the printed circuit board assembly would be periodically exposed. In addition, the PCBA shield is used to prevent electromagnetic interference generated from within the disk drive from interfering with the host electronic unit or other nearby devices. Likewise, the PCBA shield is also used to prevent electromagnetic interference generated from outside of the disk drive from interfering with the disk drive.

A topic of concern is obtaining proper electrical grounding between the printed circuit board assembly and the PCBA shield, as well as proper grounding between the printed circuit board assembly and the disk drive base.

Accordingly, there is a need in the art for an improved PCBA shield arrangement in comparison to the prior art.

SUMMARY OF THE INVENTION

An aspect of the present invention can be regarded as a disk drive. The disk drive includes a disk drive base including a pair of tab engagement slots. The disk drive further includes a printed circuit board assembly. The disk drive further includes a PCBA shield including a shield body having a first end and an opposing second end. The shield body is disposed against the printed circuit board assembly with the printed circuit board assembly between the PCBA shield and the disk drive base. The PCBA shield further includes a pair of tabs extending from and integrally formed with the shield body at the first end. The tabs each are respectively disposed in the tab engagement slots for attaching the PCBA shield to the disk drive base. The tabs each are cooperatively sized and configured with the respective tab engagement slots to apply a force between the first end of the shield body and the printed circuit board assembly. The second end is attached to the disk drive base.

According to various embodiments, the PCBA shield may be formed of a metal material. The tabs may be parallel with respect to each other. The tabs may be bent with respect to the shield body. Each tab may have a step-like cross section. The shield body may be substantially planar. The disk drive base may be formed of a metal material. The tab engagement slots may be formed of an overmolded plastic. The disk drive base may further include a pair of tab retaining members each respectively disposed over the tab engagement slots and the tabs. The tab retaining members may be formed of an overmolded plastic. The disk drive may further include a fastener. The fastener is engaged with the disk drive base through the second end for attaching the PCBA shield to the disk drive base. The fastener may be a screw.

DESCRIPTION OF THE PREFERRED EMBODIMENTS

Figure 1:
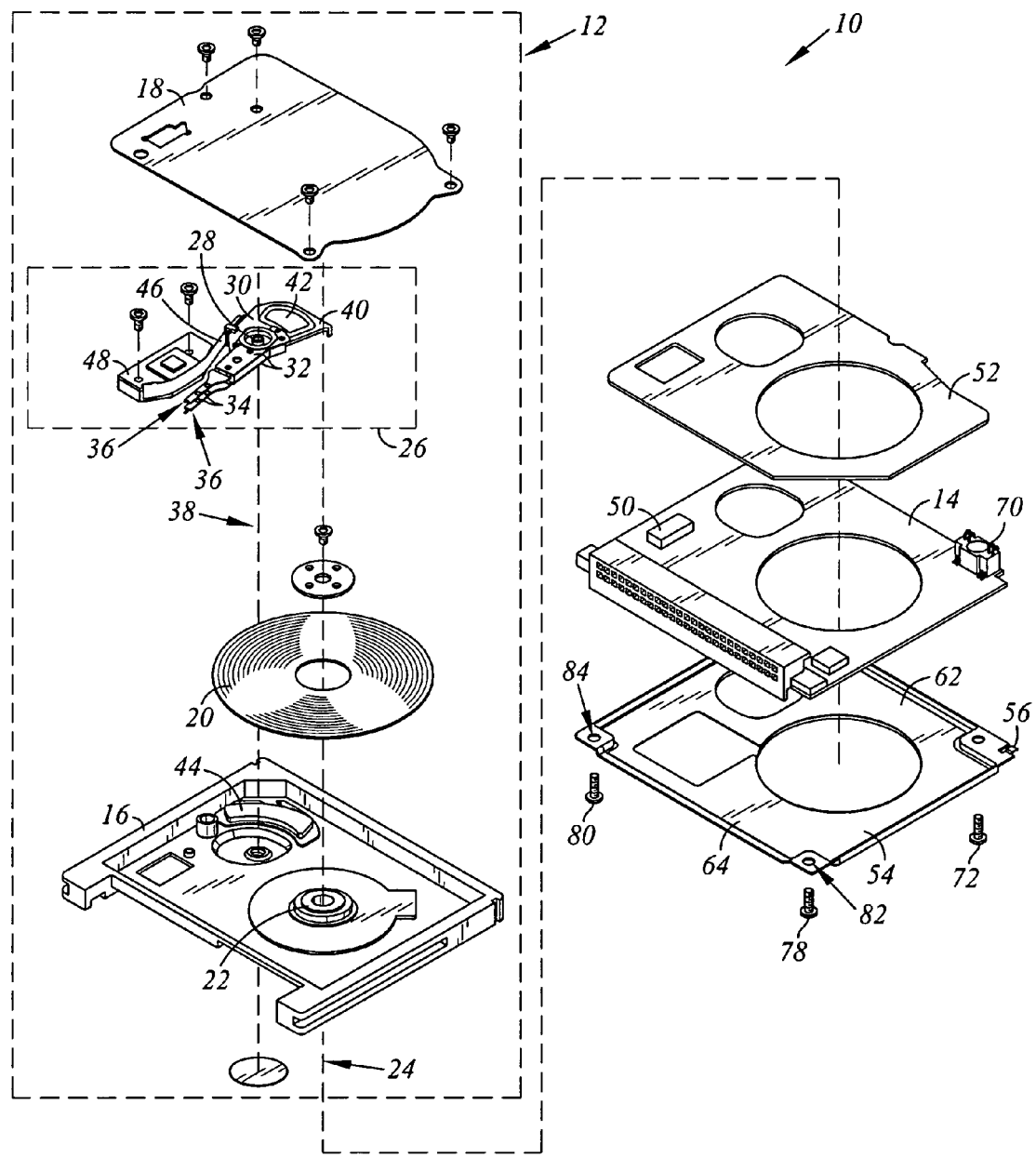
FIG. 1 is an exploded top perspective view of a disk drive in accordance with an aspect of the present invention.

Referring now to the drawings wherein the showings are for purposes of illustrating preferred embodiments of the present invention only, and not for purposes of limiting the same, FIGS. 1-7 illustrate a disk drive in accordance with the aspects of the present invention.

Referring now to FIG. 1, there is depicted an exploded perspective view of a disk drive 10 as constructed in accordance with an aspect of the present invention. The disk drive 10 includes a head disk assembly (HDA) 12 and a printed circuit board assembly (PCBA) 14. The head disk assembly 12 includes a disk drive housing having disk drive housing members, such as a disk drive base 16 and a cover 18. The disk drive base 16 and the cover 18 collectively house a disk 20. The disk 20 contains a plurality of tracks for storing data. The head disk assembly 12 further includes a spindle motor 22 for rotating the disk 20 about a disk rotation axis 24. The head disk assembly 12 further includes a head stack assembly 26 rotatably attached to the disk drive base 16 in operable communication with the disk 20. The head stack assembly 26 includes a rotary actuator 28.

The rotary actuator 28 includes an actuator body 30 and actuator arms 32 that extend from the actuator body 30. Distally attached to the actuator arms 32 are suspension assemblies 34. The suspension assemblies 34 respectively support sliders 36. Each of the sliders 36 includes a transducer head. The suspension assemblies 34 with the sliders 36 are referred to as head gimbal assemblies. It is contemplated that the number of actuator arms and suspension assemblies may vary depending upon the number of disks and disk surfaces utilized.

The actuator body 30 includes a bore, and the rotary actuator 28 further includes a pivot bearing cartridge engaged within the bore for facilitating the actuator body 30 to rotate between limited positions about an axis of rotation 38. The actuator 28 further includes a coil support 40 that extends from one side of the actuator body 30 opposite the actuator arms 32. The coil support 40 is configured to support an actuator coil 42.

A magnetic element 44 is attached to the disk drive base 16. The coil 42 interacts with the magnetic element 44 to form a voice coil motor for controllably rotating the actuator 28. The head stack assembly 26 further includes a flex circuit assembly 46 and a cable connector 48. The cable connector 48 is attached to the disk drive base 16 and is disposed in electrical communication with the printed circuit board assembly 14 through a socket 50. The flex circuit assembly 46 supplies current to the actuator coil 42 and carries signals between the transducer heads of the sliders 36 and the printed circuit board assembly 14.

A base insulator 52 is provided between the printed circuit board assembly 14 and the disk drive base 16 for selectively electrically insulating various electrical components of the printed circuit board assembly 14. As discussed in detail below, a PCBA shield 54 is provided for protecting the printed circuit board assembly 14 from both physical damage and electrical discharge events. In addition, the PCBA shield is used to prevent electromagnetic interference generated from within the disk drive from interfering with a host electronic unit or other nearby devices. Likewise, the PCBA shield is also used to prevent electromagnetic interference generated from outside of the disk drive from interfering with the disk drive. The PCBA shield 54 is disposed over the printed circuit board assembly 14 with the printed circuit board assembly 14 between the PCBA shield 54 and the disk drive base 16.

Figure 2:
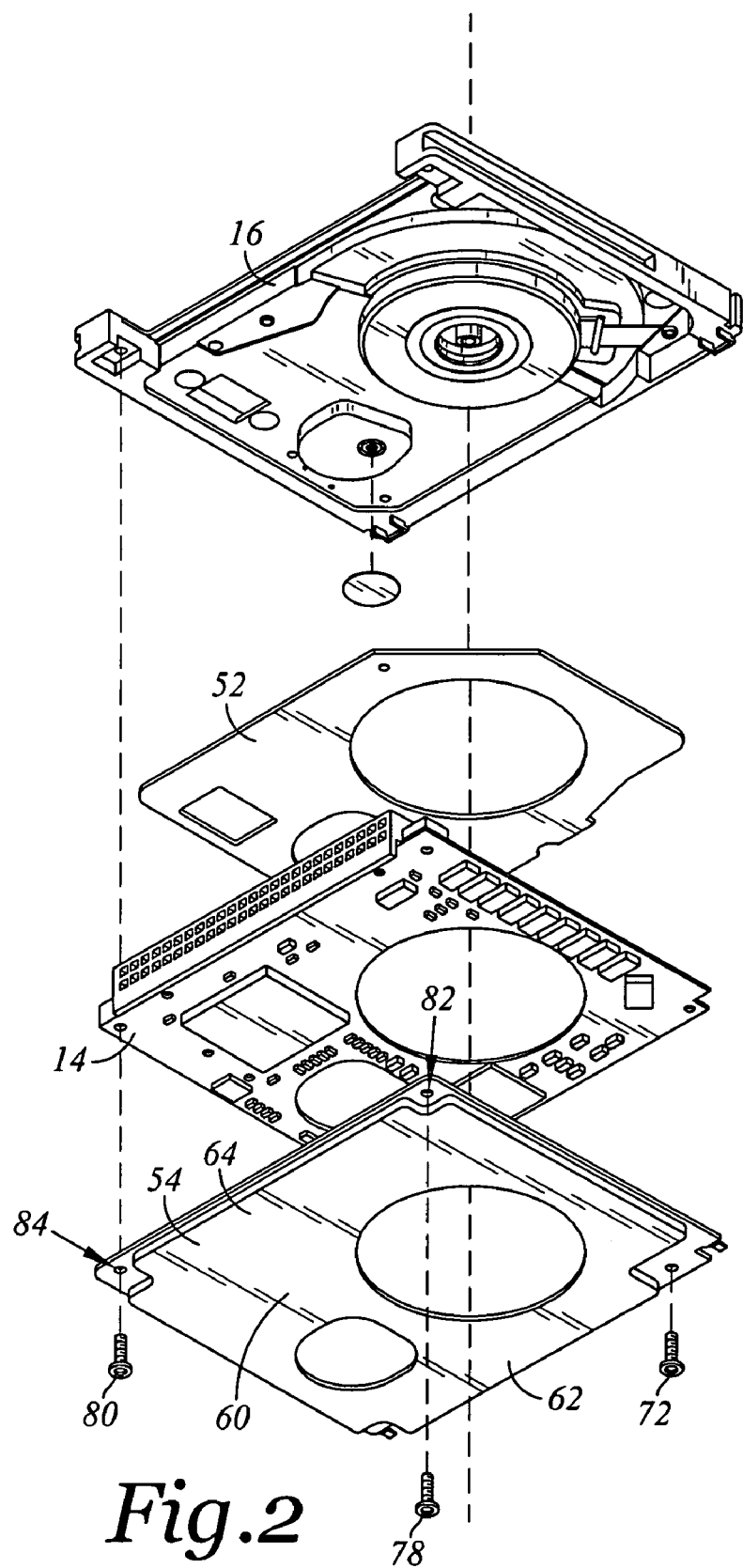
FIG. 2 is an exploded bottom perspective view of a disk drive base, a base insulator, a printed circuit board, and a PCBA shield of the disk drive of FIG. 1.
Figure 3:
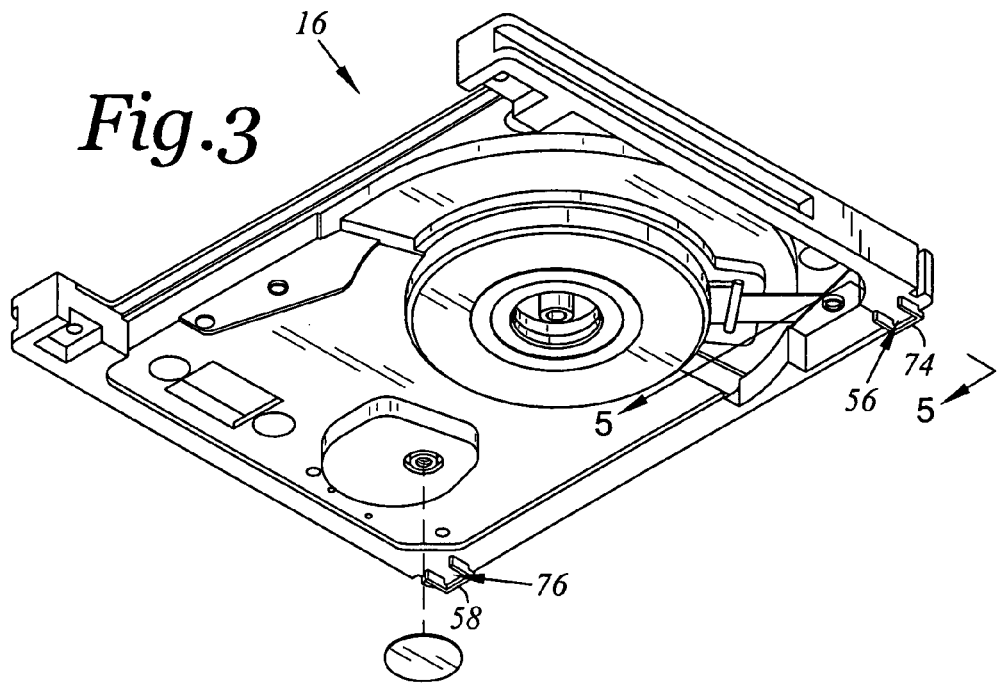
FIG. 3 is an enlarged view of the disk drive base of FIG. 2 as shown with a pair of tab engagement slots.
Figure 4:
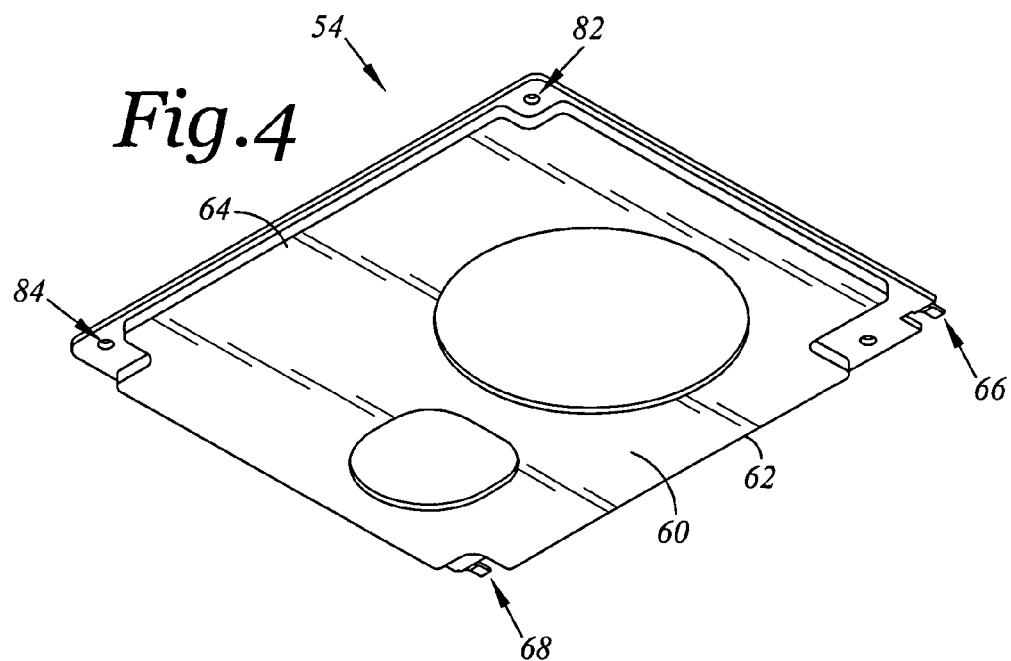
FIG. 4 is an enlarged view of the PCBA shield of FIG. 2 as shown with a pair of tabs.

Referring additionally to FIG. 2, there is shown an exploded bottom perspective view of the disk drive base 16, the base insulator 52, the printed circuit board assembly 14, and the PCBA shield 54 of the disk drive 10 of FIG. 1. FIG. 3 is an enlarged view of the disk drive base 16 of FIG. 2, and FIG. 4 is an enlarged view of the PCBA shield 54 of FIG. 2.

An aspect of the present invention can be regarded as the disk drive 10. The disk drive 10 includes the disk drive base 16. The disk drive base 16 includes a pair of tab engagement slots 56, 58. The disk drive 10 further includes the printed circuit board assembly 14. The disk drive 10 further includes the PCBA shield 54 including a shield body 60 having a first end 62 and an opposing second end 64. The shield body 60 is disposed against the printed circuit board assembly 14 with the printed circuit board assembly 14 between the PCBA shield 54 and the disk drive base 16. The PCBA shield 54 further includes a pair of tabs 66, 68 extending from and integrally formed with the shield body 60 at the first end 62. The tabs 66, 68 are each respectively disposed in the tab engagement slots 56, 58 for attaching the PCBA shield 54 to the disk drive base 16. The tabs 66, 68 each are cooperatively sized and configured with the respective tab engagement slots 56, 58 to apply a force between the first end 62 of the shield body 60 and the printed circuit board assembly 14. The second end 64 is attached to the disk drive base 16.

It is contemplated that by configuring the tabs 66, 68 and the tab engagement slots 56, 58 to apply a force between the first end 62 of the shield body 60 and the printed circuit board assembly 14 the printed circuit board assembly 14 may be electrically grounded to both the disk drive base 16 and the PCBA shield 54. In this regard, a ground pad may be disposed upon the printed circuit board assembly 14 at any location that comes in direct contact with the PCBA shield. Moreover, physical secure attachment may be achieved through such force.

Figure 5:
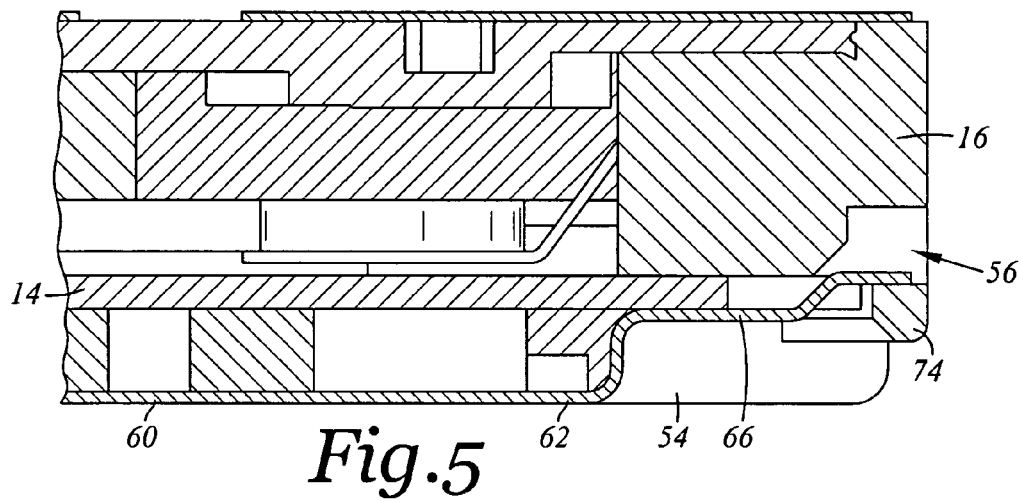
FIG. 5 is an enlarged cross-sectional side view of a portion the disk drive as assembled as seen along axis 5-5 of FIG. 3.
Figure 6:
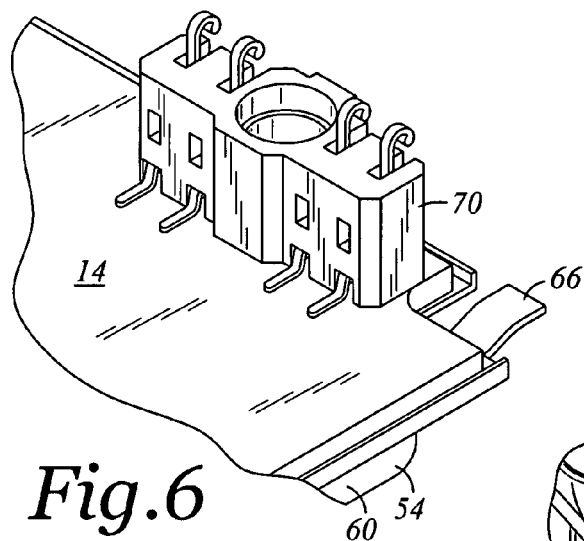
FIG. 6 is an enlarged perspective view of a portion of the printed circuit board assembly with a spindle motor connector as assembled with the PCBA shield with a tab shown.
Figure 7:
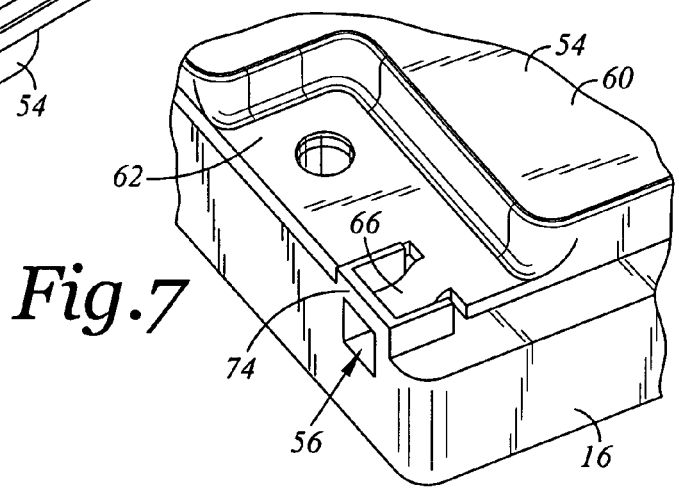
FIG. 7 is an opposite enlarged perspective view of the portion of the printed circuit board assembly and the PCBA shield of FIG. 6 as shown with a portion of the disk drive base and the tab engaged with one of the tab engagement slots.

Referring now to FIG. 5 there is depicted an enlarged cross-sectional side view of a portion of the disk drive 10 as assembled as seen along axis 5-5 of FIG. 3. FIG. 6 is an enlarged perspective view of a portion of the printed circuit board assembly 14 as assembled with the PCBA shield 54. The printed circuit board assembly 14 is shown with a spindle motor connector 70, which is used to effect electrical communication between the printed circuit board assembly 14 and the spindle motor 22. A fastener 72 may be used to affix the spindle motor connector 70 to the printed circuit board assembly 14 and the PCBA shield 54. FIG. 7 is an opposite enlarged perspective view of the portion of the printed circuit board assembly 14 and PCBA shield 54 of FIG. 6 as shown with a portion of the disk drive base 16. The tab 66 is shown as engaged with the tab engagement slot 56.

According to various embodiments, the PCBA shield 54 may be formed of a metal material. The tabs 66, 68 may be parallel with respect to each other such as viewed from a top view of the PCBA shield 54. The tabs 66, 68 may extend in a cantilever configuration and are configured to resiliently bend upon engagement with the disk drive base 16 in the slots 56, 58. The tabs 66, 68 may be bent with respect to the shield body 60. Each of the tabs 66, 68 may have a step-like cross section such as best seen in the cross-sectional side view of FIG. 5. In the embodiment shown, the tabs 66, 68 each have two opposite 45 degree bends to form the step-like cross section. The shield body 60 may be substantially planar.

The disk drive base 16 may be formed of a metal material. The tab engagement slots 56, 58 may be formed of an overmolded plastic. The disk drive base 16 may further include a pair of tab retaining members 74, 76 each respectively disposed over the tab engagement slots 56, 58 and the tabs 66, 68 such as illustrated in FIGS. 5 and 7. The tab retaining members 74, 76 may be formed of an overmolded plastic. The tab retaining members 74, 76 are thus used to hold the tabs 66, 68 in the tab engagement slots 56, 58 and deflect the tabs 66, 68 to create the force that holds the PCBA shield 54 against the printed circuit board assembly 14.

The disk drive 10 may further include at least one fastener, such as fasteners 78, 80. The fasteners 78, 80 are engaged with the disk drive base 16 through the second end 64 for attaching the PCBA shield 54 to the disk drive base 16. The PCBA shield 54 may have a complementary pair of holes 82, 84 for receiving the fasteners 78, 80. The fasteners 78, 80 may take the form of a screw such as shown. However, rather than the fasteners 78, 80 being in screw form, the PCBA shield 54 may also be attached to the disk drive base 16 via a press-fit or snap-fit type fastener that may be integrally formed with the PCBA shield 54 or the disk drive base 16.

We claim:

1. A disk drive comprising:
    a disk drive base including a pair of tab engagement slots;
    a printed circuit board assembly; and
    a PCBA shield including a shield body having a first end and an opposing second end, the shield body being disposed against the printed circuit board assembly with the printed circuit board assembly between the PCBA shield and the disk drive base, the PCBA shield further including a pair of tabs extending from and integrally formed with the shield body at the first end, the tabs each being respectively disposed in the tab engagement slots for attaching the PCBA shield to the disk drive base, the tabs each being cooperatively sized and configured with the respective tab engagement slots to apply a force between the first end of the shield body and the printed circuit board assembly, the second end being attached to the disk drive base.

2. The disk drive of claim 1 wherein the PCBA shield is formed of a metal material.

3. The disk drive of claim 1 wherein the tabs are parallel with respect to each other.

4. The disk drive of claim 1 wherein the tabs are bent with respect to the shield body.

5. The disk drive of claim 4 wherein the tabs each having a step-like cross section.

6. The disk drive of claim 1 wherein the shield body is substantially planar.

7. The disk drive of claim 1 wherein the disk drive base is formed of a metal material.

8. The disk drive of claim 7 wherein the tab engagement slots are formed of an overmolded plastic.

9. The disk drive of claim 1 wherein the disk drive base further includes a pair of tab retaining members each respectively disposed over the tab engagement slots and the tabs.

10. The disk drive of claim 9 wherein the tab retaining members are formed of an overmolded plastic.

11. The disk drive of claim 1 further includes a fastener, the fastener is engaged with the disk drive base through the second end for attaching the PCBA shield to the disk drive base.

12. The disk drive of claim 9 wherein the fastener is a screw.

* * * * *